US010048782B2

(12) United States Patent
Park

(10) Patent No.: US 10,048,782 B2
(45) Date of Patent: Aug. 14, 2018

(54) APPARATUS AND METHOD FOR EXECUTING A MENU IN A WIRELESS TERMINAL

(75) Inventor: Se-Hwan Park, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1370 days.

(21) Appl. No.: 12/607,651

(22) Filed: Oct. 28, 2009

(65) Prior Publication Data
US 2010/0103105 A1 Apr. 29, 2010

(30) Foreign Application Priority Data
Oct. 28, 2008 (KR) ........................ 10-2008-0105827

(51) Int. Cl.
G06F 3/038 (2013.01)
H04N 21/422 (2011.01)
H04N 21/4363 (2011.01)
H04N 21/4223 (2011.01)
H04N 21/44 (2011.01)
H04N 5/445 (2011.01)
H04N 5/232 (2006.01)
H04N 5/14 (2006.01)
H04N 5/44 (2011.01)

(52) U.S. Cl.
CPC .......... G06F 3/0386 (2013.01); H04N 5/232 (2013.01); H04N 5/44582 (2013.01); H04N 21/4222 (2013.01); H04N 21/4223 (2013.01); H04N 21/42209 (2013.01); H04N 21/42221 (2013.01); H04N 21/42222 (2013.01); H04N 21/43637 (2013.01); H04N 21/44008 (2013.01); H04N 5/144 (2013.01); H04N 2005/4428 (2013.01); H04N 2005/4432 (2013.01)

(58) Field of Classification Search
CPC .............. G06F 3/0386; H04N 21/4222; H04N 21/42221; H04N 21/4223; H04N 21/42209; H04N 21/43637; H04N 21/42222; H04N 5/232; H04N 5/44582; H04N 5/144; H04N 2005/4428; H04N 2005/4432
See application file for complete search history.

(56) References Cited

U.S. PATENT DOCUMENTS 5,410,326 A * 4/1995 Goldstein .............. G08C 23/04
340/12.26
6,225,938 B1 * 5/2001 Hayes .................. G11B 15/023
235/462.45
8,836,487 B2 9/2014 Shin
2003/0071855 A1 * 4/2003 Kim ............................. 345/810
(Continued)

FOREIGN PATENT DOCUMENTS

KR 1020040099024 11/2004
KR 1020070009261 1/2007

Primary Examiner — Mihir K Rayan
(74) Attorney, Agent, or Firm — The Farrell Law Firm, P.C.

(57) ABSTRACT

A menu execution apparatus and method for conveniently providing a menu in a wireless terminal are provided. The apparatus includes a pointer unit for indicating a specific object in a menu execution recognition mode. A camera photographs the object indicated by the pointer unit in the menu execution recognition mode. A controller controls an operation for recognizing the object indicated by the pointer unit and photographed by the camera and displaying a menu for controlling the recognized object.

17 Claims, 12 Drawing Sheets

(56) References Cited

U.S. PATENT DOCUMENTS

| | | | |
|---|---|---|---|
| 2003/0103088 A1* | 6/2003 | Dresti | G06F 3/0481 715/835 |
| 2003/0141987 A1* | 7/2003 | Hayes | G08C 19/28 340/12.25 |
| 2003/0151672 A1* | 8/2003 | Robins et al. | 348/208.6 |
| 2004/0130628 A1* | 7/2004 | Stavely | H04N 5/23248 348/208.4 |
| 2004/0208588 A1* | 10/2004 | Colmenarez | G08C 19/28 398/115 |
| 2005/0103846 A1* | 5/2005 | Zhu et al. | 235/462.07 |
| 2005/0116945 A1* | 6/2005 | Mochizuki | G06K 9/2081 345/418 |
| 2005/0248664 A1* | 11/2005 | Enge | 348/222.1 |
| 2006/0029377 A1* | 2/2006 | Stavely et al. | 396/54 |
| 2006/0050052 A1* | 3/2006 | Mekenkamp | G06F 3/017 345/156 |
| 2006/0125968 A1* | 6/2006 | Yokozawa | G06F 3/033 348/734 |
| 2007/0035616 A1* | 2/2007 | Lee | H04N 1/00307 348/14.16 |
| 2007/0279244 A1* | 12/2007 | Haughawout | G08C 19/28 340/4.31 |
| 2008/0034081 A1* | 2/2008 | Marshall | G08C 17/02 709/223 |
| 2008/0247757 A1* | 10/2008 | Um | G08C 23/04 398/106 |
| 2008/0279453 A1* | 11/2008 | Candelore | G03B 21/26 382/176 |
| 2008/0316181 A1* | 12/2008 | Nurmi | 345/173 |
| 2009/0091532 A1* | 4/2009 | Hockett | G06F 3/0386 345/158 |
| 2014/0327782 A1* | 11/2014 | Mangla | G06F 3/00 348/161 |
| 2016/0073151 A1* | 3/2016 | Keller | H04N 21/42208 348/734 |

* cited by examiner

APPARATUS AND METHOD FOR EXECUTING A MENU IN A WIRELESS TERMINAL

PRIORITY

This application claims priority under 35 U.S.C. § 119(a) to a Korean Patent Application filed in the Korean Intellectual Property Office on Oct. 28, 2008 and assigned Serial No. 10-2008-105827, the content of which is incorporated herein by reference.

BACKGROUND OF THE INVENTION

1. Field of the Invention

The present invention relates generally to an apparatus and method for executing a menu in a wireless terminal, and in particular, to a menu execution apparatus and method for conveniently providing a menu in a wireless terminal.

2. Description of the Related Art

The pressing of a menu button provided on a wireless terminal generally provides a user with a fixed menu tree, through which a user may move up or down in search of a desired menu.

However, a large number of menu trees and functions are actually embedded in the wireless terminal, making it difficult to find a desired function to be used. For example, a TeleVision (TV) remote control function is usually embedded in the wireless terminal, and the availability of the function is decreased because it is difficult for the wireless terminal to recognize when the user desires to perform a function and the recognition is possible only through the user's menu manipulation. This makes it inconvenient to use certain services.

To provide a user-desired function at a proper time, various input estimation technologies are being developed. However, there is a problem in that a recognition rate is significantly low because the above-described technologies perform a recognition operation by analyzing a currently observable event rather than an observable event by a certain indication.

SUMMARY OF THE INVENTION

The present invention is designed to address at least the problems and/or disadvantages described above and to provide at least the advantages described below. Accordingly, an aspect of the present invention is to provide an apparatus and method for executing a menu in a wireless terminal for which a user notifies the wireless terminal of an object targeted for a service and receives a menu for controlling the object from the wireless terminal.

According to one aspect of the present invention, there is provided an apparatus for executing a menu in a wireless terminal, including a pointer unit for indicating a specific object in a menu execution recognition mode, a camera for photographing the object indicated by the pointer unit in the menu execution recognition mode, and a controller for controlling an operation for recognizing the object indicated by the pointer unit and photographed by the camera and displaying a menu for controlling the recognized object.

According to another aspect of the present invention, there is provided a method for executing a menu in a wireless terminal, including indicating a specific object by a pointer unit when the wireless terminal switches to a menu execution recognition mode, photographing the object indicated by the pointer unit using a camera, and recognizing the photographed object and displaying a menu for controlling the recognized object.

BRIEF DESCRIPTION OF THE DRAWINGS

The above and other aspects, features and advantages of the present invention will become more apparent from the following detailed description when taken in conjunction with the accompanying drawings in which.

Throughout the drawings, the same drawing reference numerals will be understood to refer to the same elements, features and structures.

DETAILED DESCRIPTION OF THE EMBODIMENTS OF THE INVENTION

The matters defined in the description such as a detailed construction and elements are provided to assist in a comprehensive understanding of embodiments of the invention. Accordingly, those of ordinary skill in the art will recognize that various changes and modifications of the embodiments described herein can be made without departing from the scope and spirit of the invention. Also, descriptions of well-known functions and constructions are omitted for the sake of clarity and conciseness.

Figure 1:
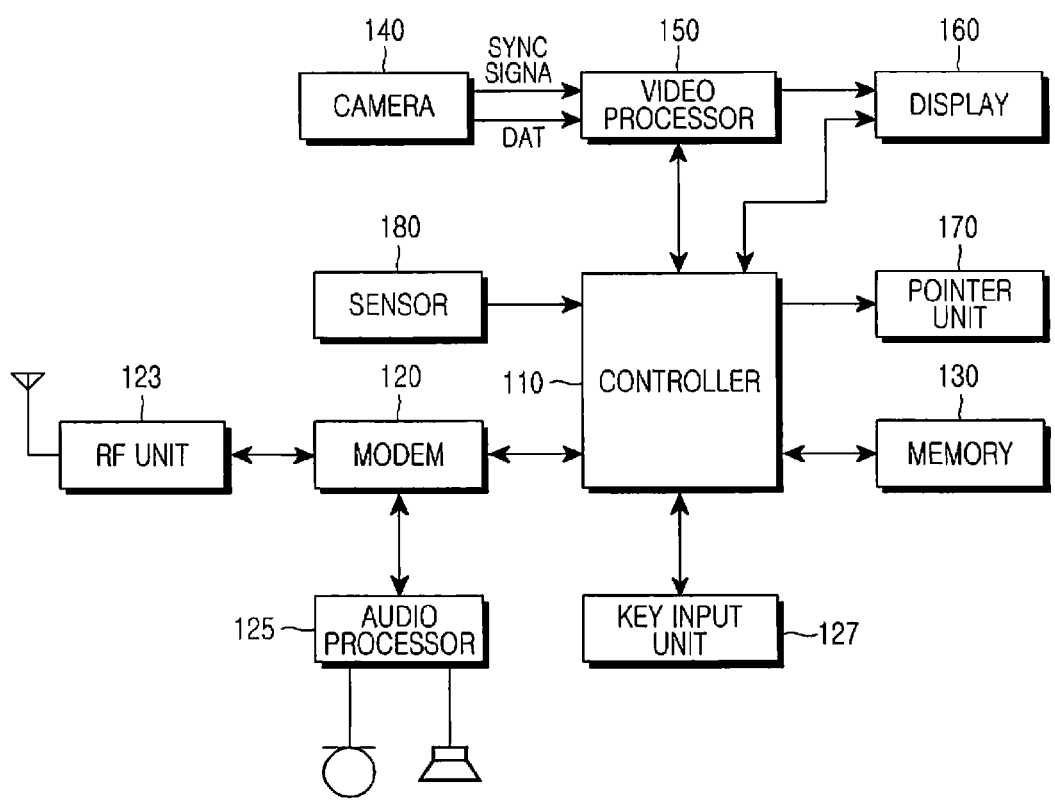
FIG. 1 illustrates a wireless terminal according to an embodiment of the present invention.

FIG. 1 illustrates a wireless terminal according to an embodiment of the present invention.

Referring to FIG. 1, a Radio Frequency (RF) unit 123 performs radio communication for the wireless terminal, and includes an RF transmitter for up-converting a frequency of a transmission signal and amplifying the up-converted transmission signal, and an RF receiver for low-noise-amplifying a received signal and down-converting a frequency of the low-noise-amplified signal. A modem 120 includes a transmitter for encoding and modulating the transmission signal, and a receiver for decoding and demodulating the received signal. An audio processor 125 may be a codec having a data codec for processing packet data and an audio codec for processing an audio signal such as voice. The audio processor 125 converts a digital audio signal received from the modem 120 into an analog signal through the audio codec for reproduction. Alternatively, the audio processor 125 converts a transmission analog audio signal generated from a microphone into a digital audio signal through the audio codec for transmission to the modem 120. The codec may be separately provided or included in a controller 110.

A memory 130 includes a program memory and a data memory. The program memory stores programs for controlling general operations of the wireless terminal and control programs for controlling an operation for displaying a menu to control an object indicated by a pointer unit 170 of the wireless terminal according to an embodiment of the present invention. The data memory temporarily stores data generated during execution of the programs. The memory 130 stores a letter read program for image processing for recognizing a letter image in a menu execution recognition mode and an image shape comparison program for recognizing a shape image according to an embodiment of the present invention.

The controller 110 controls the overall operation of the wireless terminal, and may include the modem 120 and the codec. According to an embodiment of the present invention, the controller 110 controls an operation for recognizing an object indicated by the pointer unit 170 and photographed by a camera 140 and displaying a menu for controlling the recognized object.

When a sensor 180 does not sense any motion of a user during at least a given time after the pointer unit 170 operates in the menu execution recognition mode, the controller 110 controls the camera 140 to operate.

The controller 110 controls an operation for comparing a first image captured by photographing an object indicated by a pointer of the pointer unit 170 using the camera 140 to a second image captured by photographing the same object after the pointer unit 170 is terminated, and for extracting given pixel values hidden by the pointer displayed on the first image.

The controller 110 also controls an operation for setting a minimal unit area around the pointer displayed on the first image and determining a recognition type through an image included in the minimal unit area. When the recognition type is letters, the controller 110 controls an operation for recognizing the letters by extending the minimal unit area in a given area unit and displaying a menu for controlling the letters. When the recognition type is a shape, the controller 110 controls an operation for determining an external device corresponding to the shape while extending the minimal unit area in a given area unit, and displaying a menu for controlling the external device.

The controller 110 may also control the pointer unit 170 and the camera 140 to simultaneously operate in the menu execution recognition mode. The controller 110 controls an operation for storing an image captured by photographing a specific object using the camera 140 and extracting a specific area having pixel values, corresponding to a plurality of points indicated by the pointer unit 170, as boundary values from the captured image. The controller 110 controls an operation for displaying a menu to control an image included in the extracted specific area.

The camera 140 includes a camera sensor for converting photographed optical signals into electrical signals and a signal processor for converting analog image signals from the camera sensor into digital data. Here, the camera sensor is assumed to be a Charge Coupled Device (CCD) sensor, and the signal processor can be embodied with a Digital Signal Processor (DSP). The camera sensor and the signal processor can be embodied integrally or separately. In accordance with an embodiment of the present invention, the camera 140 photographs an object indicated by the pointer unit 170 in the menu execution recognition mode, and is mounted at the same position as the pointer unit 170.

A video processor 150 generates screen data for displaying an image signal output from the camera 140. The video processor 150 processes an image signal output from the camera 140 on a frame basis and outputs frame image data suitable for the characteristics and size of a display 160. The video processor 150 includes a video codec, which compresses frame image data displayed on the display 160 according to a compression method or recovers original frame image data from compressed frame image data. The video codec may be a Joint Photographic Experts Group (JPEG) codec, Moving Picture Experts Group-4 (MPEG-4) codec, or Wavelet codec. The video processor 150 may have an On Screen Display (OSD) function and may output OSD data according to a screen size displayed under the control of the controller 110.

The display 160 displays an image signal output from the video processor 150 on a screen and displays user data output from the controller 110. Here, the display 160 may be a Liquid Crystal Display (LCD), and if so, the display 160 may include an LCD controller, a memory for storing image data, and an LCD device. When the LCD is implemented with a touch screen, the display 160 may also serve as an input unit. According to an embodiment of the present invention, the display 160 displays a menu for controlling an object indicated by the pointer unit 170 of the wireless terminal in the menu execution recognition mode.

A key input unit 127 includes alphanumeric keys for inputting number and letter information and function keys for setting various functions, and may also include a specific menu key for switching to the menu execution recognition mode.

The pointer unit 170 may be a laser pointer, which is used to indicate a specific object in the menu execution recognition mode.

In the menu execution recognition mode, the sensor 180 senses motion of the wireless terminal after the pointer unit 170 operates. The sensor 180 may include an acceleration sensor and a geomagnetic sensor.

Figure 2A:
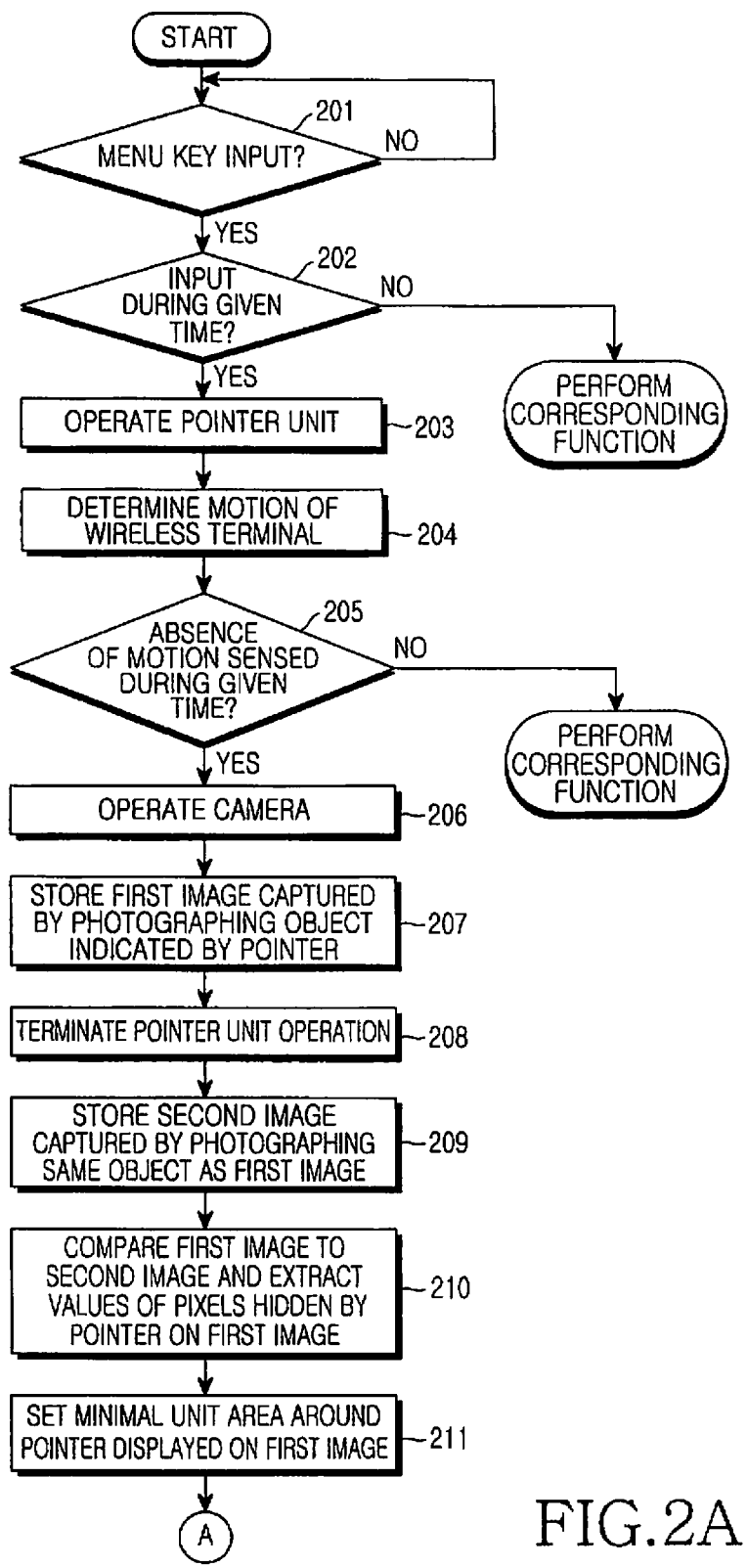
FIGS. 2A and 2B illustrates a menu execution process in the wireless terminal according to an embodiment of the present invention.
Figure 2B:
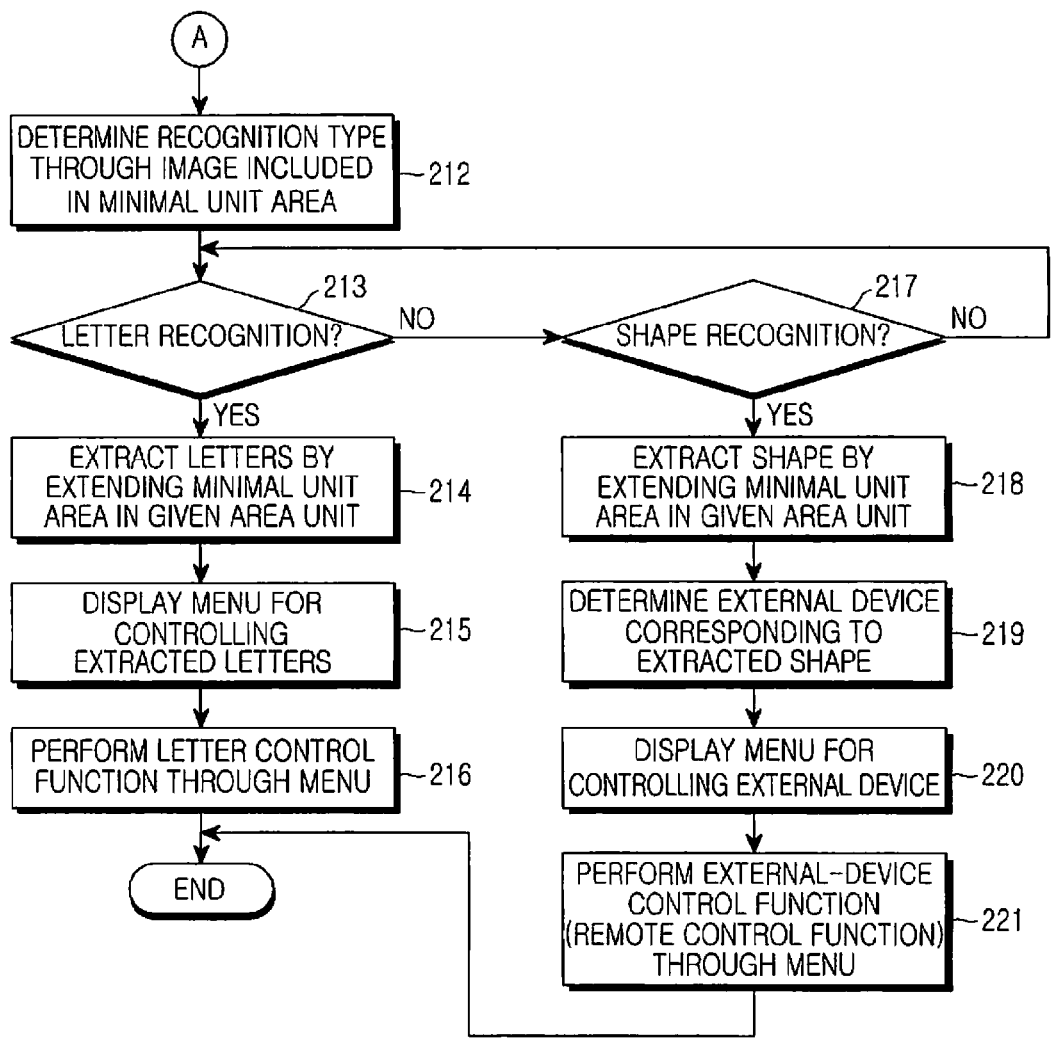

FIGS. 2A and 2B illustrate a menu execution process in the wireless terminal according to a first embodiment of the present invention, and FIGS. 4A to 4G are diagrams for explaining the process of FIGS. 2A and 2B.

Referring to FIGS. 2A and 2B, the controller 110 senses when a menu key is input to a wireless terminal 100, and determines whether the menu key is input during a given time in step 201. When the menu key is input during the given time, the controller 110 senses it in step 202 and then operates the pointer unit 170 in step 203. When the pointer unit 170 operates in step 203, the controller 110 controls an operation for generating a start sound or vibration so that the user can be notified of a recognition mode start.

After the pointer unit 170 operates, the controller 110 determines whether a motion signal is received from the sensor 180 for sensing motion of the wireless terminal in step 204. In step 205, the controller 110 senses when no motion signal is received from the sensor 180 during a given time in step 204, and then operates the camera 140 by determining that the user of the wireless terminal indicates a specific object using the pointer unit 170 since his/her motion is absent in step 206.

Figure 4A:
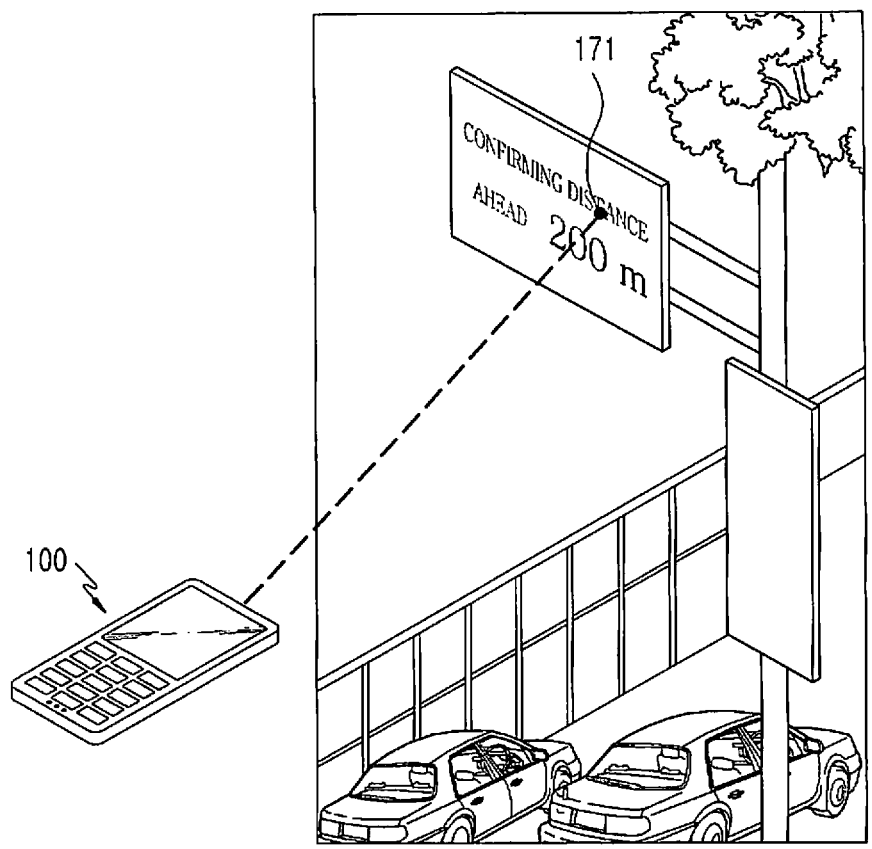
FIGS. 4A to 4H are diagrams for explaining the processes illustrated FIGS. 2A-2B, and 3.
Figure 4B:
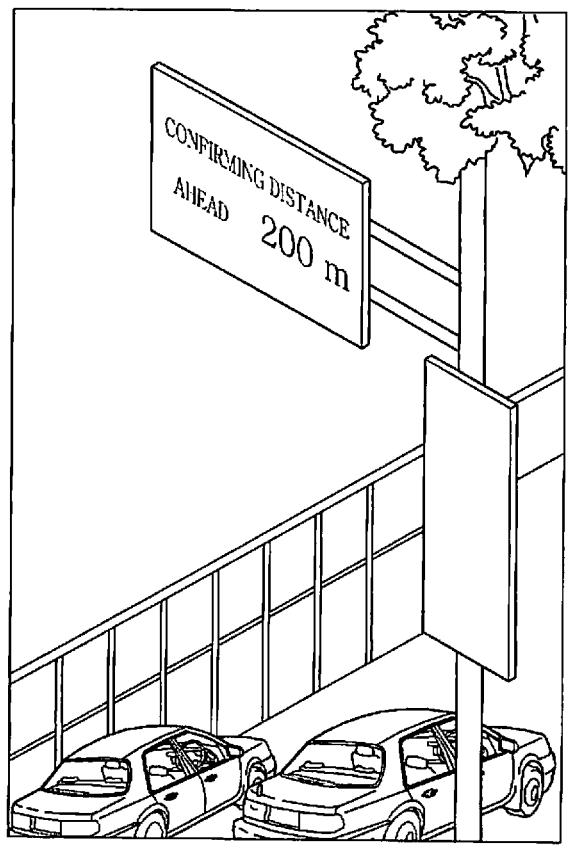

The controller 110 controls the camera 140 to photograph an object indicated by the pointer unit 170 and stores a first image in the memory 130 in step 207. The first image of step 207 is captured along with a pointer 171 indicated by the pointer unit 170 as illustrated in FIG. 4A. When the first image is captured and stored, the controller 110 terminates the operation of the pointer unit 170 in step 208. When the operation of the pointer unit 170 is terminated, the controller 110 controls the camera 140 to photograph the same object as the first image and store a second image in the memory 130 in step 209. The second image captured in step 209 is substantially the same as the first image as illustrated in FIG. 4B, but the pointer 171 is not photographed and displayed on the second image since the operation of the pointer unit 170 is terminated.

The controller 110 compares the first image to the second image in step 210, and the controller 110 computes pixel values of a partial image hidden by the pointer 171 displayed on the first image by extracting pixel values at points corresponding to the pointer 171 of the first image from the second image.

Figure 4C:
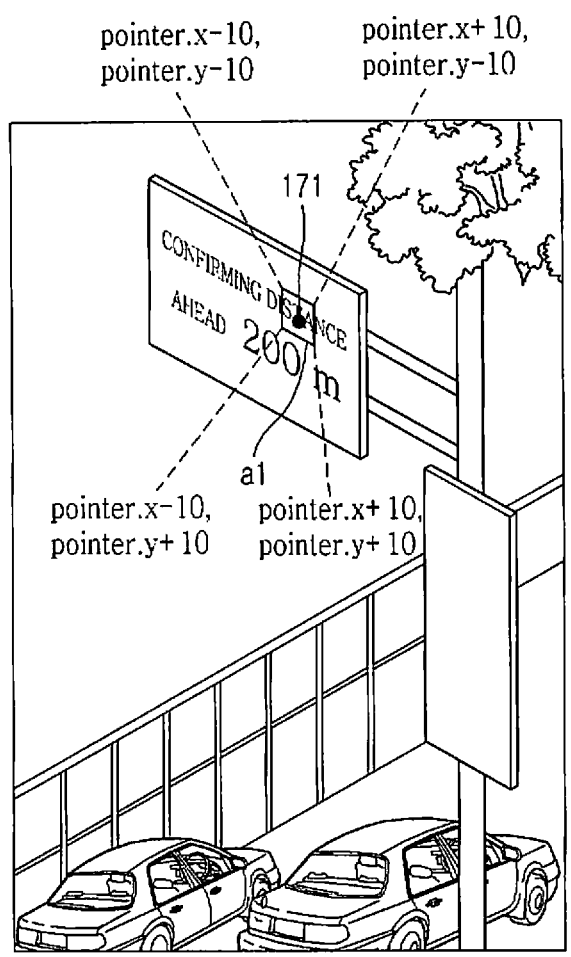

The controller 110 sets a minimal unit area around the pointer 171 displayed on the first image in step 211. FIG. 4C illustrates a minimal unit area a1 designated by 10×10 pixels in the horizontal and vertical directions around the pointer 171. As illustrated in FIG. 4C, when the minimal unit area a1 is set around the pointer 171, the controller 110 determines a recognition type through an image included in the minimal unit area a1 in step 212.

The recognition type may be classified into a letter image and a shape image. The letter image may include letters for languages such as Korean, Chinese, and English, as well as telephone numbers and trademarks. The shape image may display external devices such as a TV, an air conditioner, audio, video, a car, a home key, a Bluetooth® device, and a clock. The letter image can be recognized through the letter read program for image processing stored in the memory 130, and the shape image can be recognized through the image shape comparison program stored in the memory 130. Whereby the recognition type is determined by applying a priority for recognition. An example of priorities of Language→Telephone Number→External Device will be described.

In step 212, the controller 110 determines whether the image included in the minimal unit area is letters through the letter read program for image processing. The controller 110 when the image included in the minimal unit area is for the letters and switches to a letter recognition mode in step 213.

To recognize one word from the letter image included in the minimal unit area in the letter recognition mode, the controller 110 extracts letters by extending the minimal unit area in a given area unit in step 214, and performs a process for extending the minimal unit area in the given area unit around the pointer 171 until one word can be recognized by finding a start point of the letters. The controller 110 can find one word by computing a ratio of top/bottom/left/right margins of the letters included in the extended area whenever the minimal unit area is extended in the given area unit. Accordingly, when the top/bottom/left/right margins of the letters have the same ratio, the controller 110 can extract one word.

Figure 4D:
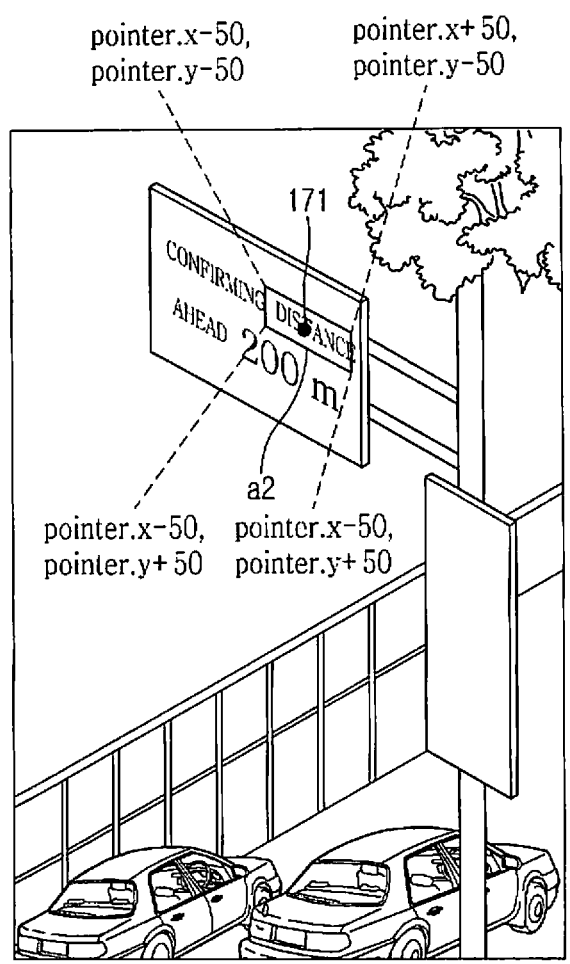

FIG. 4D illustrates an extended area a2 including one word "Distance" through a process in which the minimal unit area a1 of FIG. 4C is extended in a given area unit, for example, in a unit of 10 pixels.

Figure 4E:
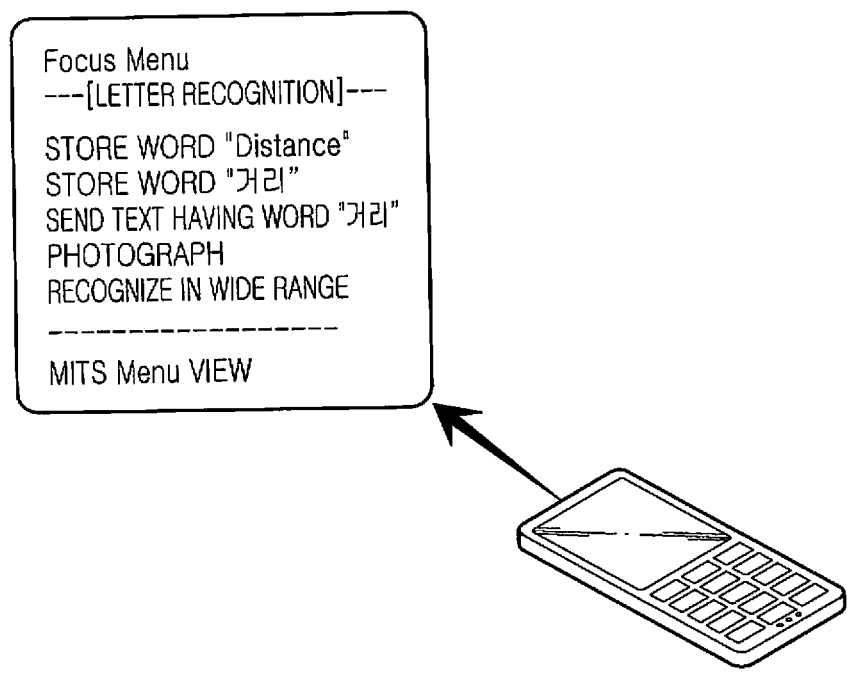

When the letters are extracted in step 214, the controller 110 finds a menu for controlling the extracted letters and displays the menu on the display 160 as illustrated in FIG. 4E in step 215. The menu for controlling the letters can be preset and stored in the memory 130. Using the menu displayed on the display 160 of the wireless terminal in step 215, the user can perform a function for controlling the extracted letters of step 214 in step 216.

When the menu for controlling the extracted letters of "Distance" is displayed as illustrated in FIG. 4E, the menu includes (1) Store Word "Distance" and (2) Store Word "거리" (Korean word corresponding to "Distance"), which are options for storing the word to perform "Add" function when the letters are input, and further includes (3) Send Text Having Word "거리", which is an option for containing the word "거리" in message content in a text message mode, (4) Photograph, which is an option for photographing the extracted letters, and (5) Recognize In Wide Range, which is an option for recognizing the entire image including the extracted letters.

When the controller 110 determines that the image included in the minimal unit area is not a letter image through the letter read program for image processing in step 212, it is determined whether the image included in the minimal unit area is a shape image through the image shape comparison program. The controller 110 senses when the image included in the minimal unit area is the shape image, and switches to a shape recognition mode in step 217. When pixel values of the image included in the minimal unit area exceed a threshold value, regardless of the above-described priorities, the image can be determined to be the shape image.

In the shape recognition mode, the controller 110 extracts a shape by extending the minimal unit area in a given area unit in step 218. Similar to step 214, the shape image in step 218 can be fully recognized through a process for extending the minimal unit area in a give area unit around the pointer.

When the shape is fully recognized in step 218, the controller 110 determines an external device corresponding to the recognized shape in step 219. In step 219, the controller 110 can determine a type of external device by extracting information of the external device corresponding to the recognized shape from the memory 130 for storing the information of the external device corresponding to the recognized shape.

When the type of external device is determined, the controller 110 finds a menu for controlling the external device and displays the menu on the display 160 in step 220. The menu for controlling the external device can be preset and stored in the memory 130. Using the menu displayed on the display 160 of the wireless terminal in step 220, the user performs a function for controlling the external device in step 221.

Figure 4F:
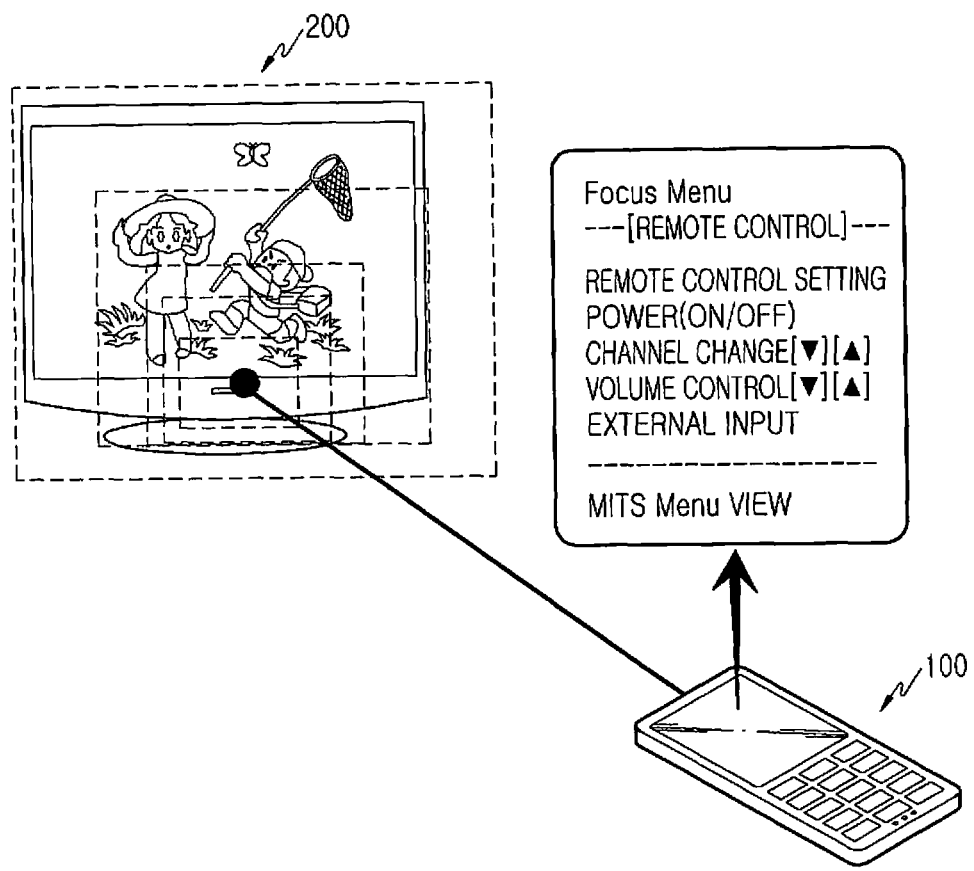

FIG. 4F illustrates a function for displaying a menu to perform a TV control function, that is, a TV remote control function, on the display 160 of the wireless terminal 100 and controlling a TV through the menu, when the external device recognized in step 219 is a TV 200.

Figure 4G:
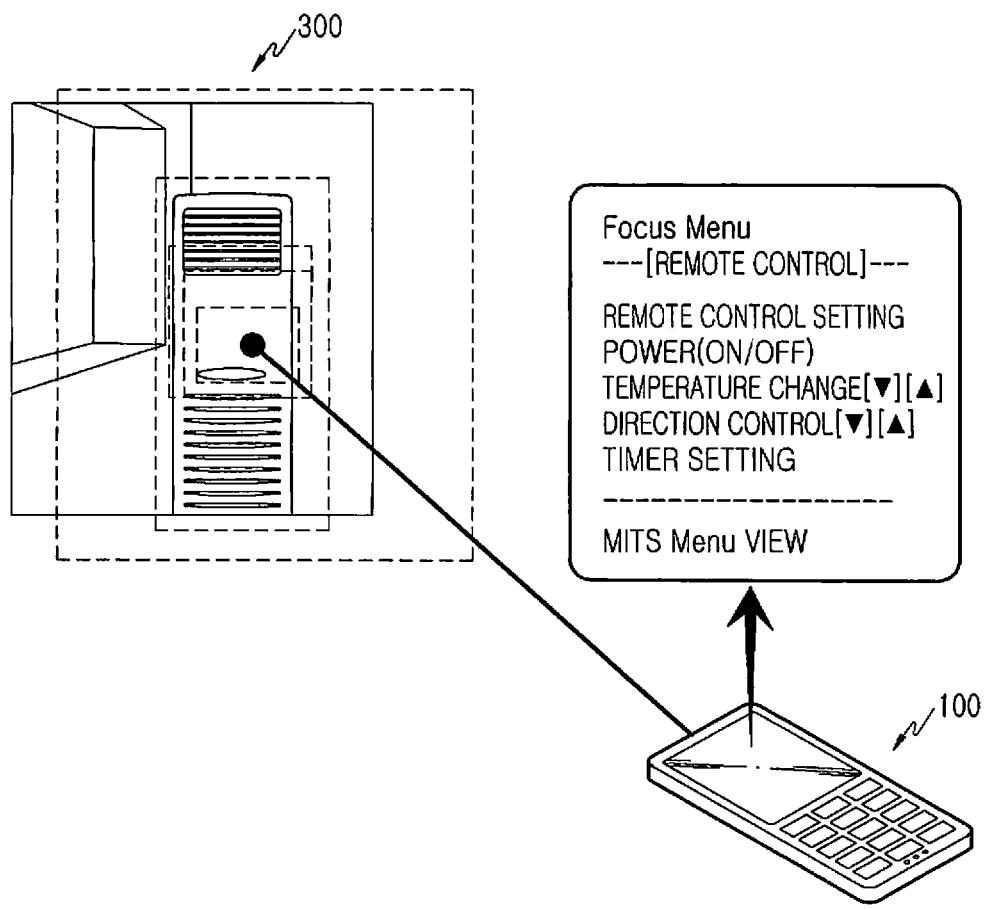

FIG. 4G illustrates a function for displaying a menu to perform an air-conditioner control function, that is, an air-conditioner remote control function, on the display 160 of the wireless terminal 100 and controlling an air conditioner through the menu, when the external device recognized in step 219 is an air conditioner 300.

Figure 3:
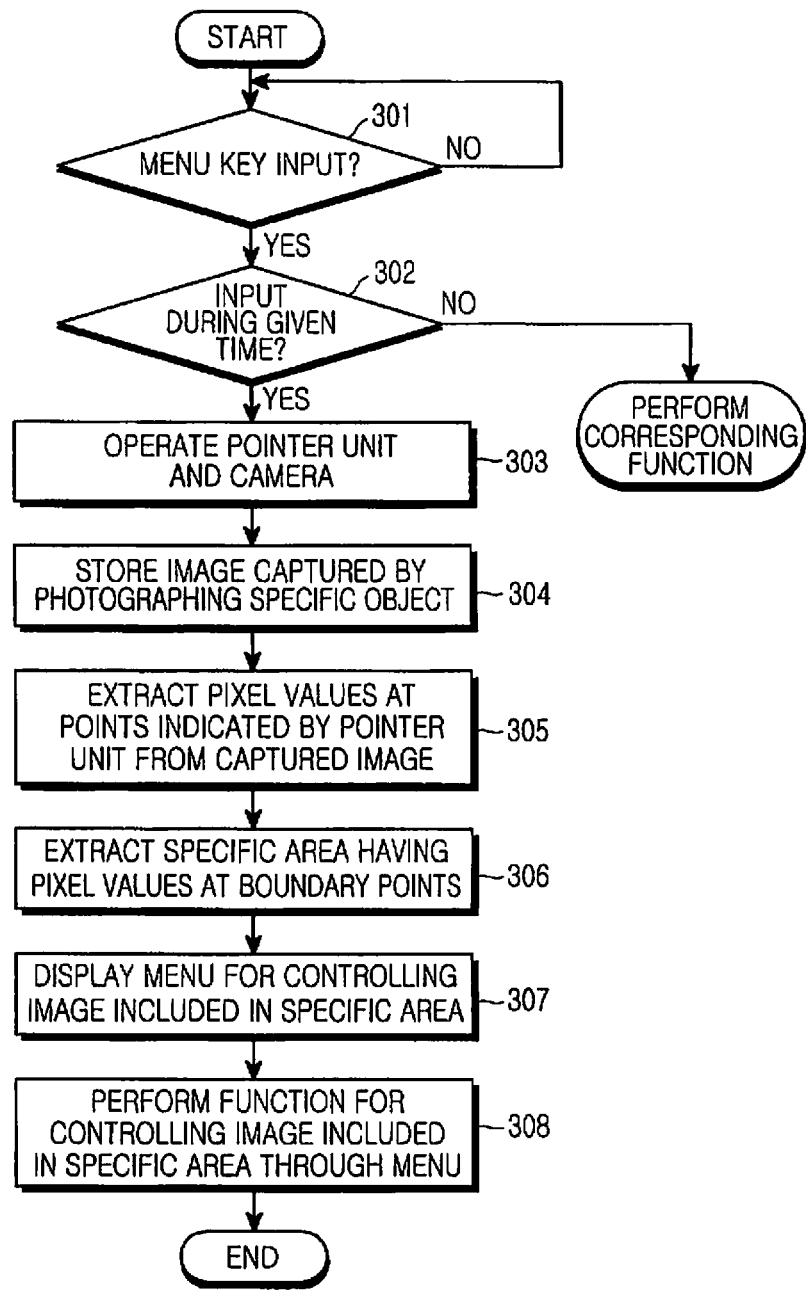
FIG. 3 illustrates a menu execution process in the wireless terminal according to an embodiment of the present invention.
Figure 4H:
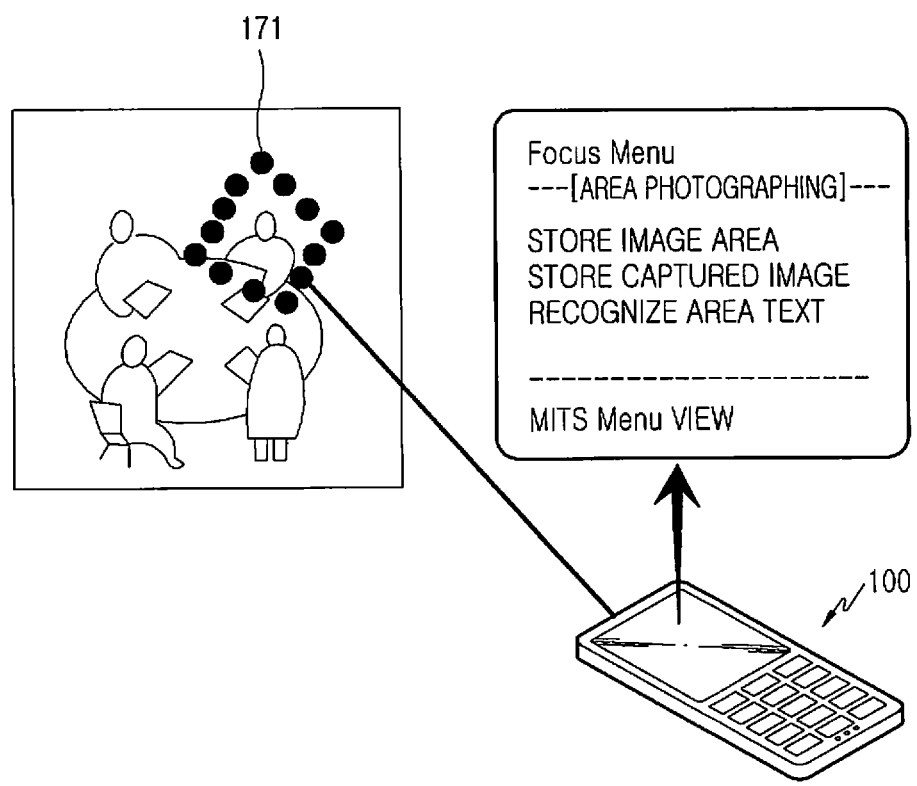

FIG. 3 is a flowchart of a menu execution process in the wireless terminal according to an embodiment of the present invention, and FIG. 4H is a diagram for explaining the process of FIG. 3.

Referring to FIG. 3, and with reference to FIGS. 3 and 4H, the controller 110 senses when a menu key is input to the wireless terminal 100, and determines whether the menu key is input during a given time in step 301. The controller 110 senses when the menu key is input during the given time in step 302, and then simultaneously operates the pointer unit 170 and the camera 140 in step 303.

The controller 110 controls the camera 140 to photograph a specific object indicated by the pointer unit 170 and stores a captured image in the memory 130 in step 304. When a plurality of points are designated on the image by the pointer unit 170 after the image is captured in step 304, the controller 110 extracts pixel values corresponding to the plurality of points from the image in step 305.

The controller 110 extracts a specific area having the extracted pixel values of step 305 as boundary values from the image in step 306 and finds a menu for controlling an image included in the specific area and displays the menu on the display 160 in step 307. The menu for controlling the image included in the specific area can be preset and stored in the memory 130. Using the menu displayed on the display 160 of the wireless terminal in step 307, the user performs a function for controlling the image included in the specific area in step 308.

In FIG. 4H, a specific area for part of a human body of a person is designated by a plurality of pointers 171, that is, a plurality of points, on a captured image. When the specific area having boundary values at the plurality of points is extracted, a menu for controlling the specific area is displayed.

As described above, the embodiments of the present invention provide an apparatus and method for executing a menu in a wireless terminal, which can provide a new customized user interface since the wireless terminal immediately provides a user with a menu for controlling an object when the user indicates a desired object using a pointer unit provided in the wireless terminal as if a person indicates the object with a finger.

While the present invention has been shown and described with reference to certain embodiments thereof, it will be understood by those skilled in the art that various changes in form and details may be made therein without departing from the spirit and scope of the invention as defined by the appended claims.

What is claimed is:

1. A wireless terminal for executing a menu, comprising:
a touch screen;
a light emitting pointer unit for emitting light for pointing at an external object;
a camera configured to photograph an external object;
a sensor configured to sense a motion of the wireless terminal; and
a controller configured to at least:
control an operation for simultaneously operating the light emitting pointer unit and the camera upon sensing a predetermined input of one of an input unit and the touch screen,
control the camera to photograph an external object pointed at by the light emitted from the light emitting pointer unit, in response to determining a motion of the wireless terminal is absent during a given time,
control to recognize the photographed external object pointed at by the light emitted from the light emitting pointer unit, and
control to display a menu on the touch screen for controlling the recognized external object.

2. The wireless terminal of claim 1, wherein the light emitting pointer unit and the camera are mounted at a same position.

3. The wireless terminal of claim 1, wherein the controller is further configured to:
control an operation for comparing a first image, captured by photographing the external object pointed at by the light emitted from the light emitting pointer unit using the camera, to a second image captured by photographing the external object after the light emitting pointer unit is terminated, and
extract values of pixels hidden by the light emitted from the light emitting pointer unit displayed on the first image from the second image.

4. The wireless terminal of claim 3, wherein the controller is further configured to:
control an operation for setting a minimal unit area around the light emitted from the light emitting pointer unit displayed on the first image, and
determine a recognition type through an image included in the minimal unit area.

5. The wireless terminal of claim 4, wherein the recognition type is determined by applying a priority for recognition.

6. The wireless terminal of claim 4, wherein the controller is further configured to:
control an operation for recognizing letters by extending the minimal unit area in a given area unit when the recognition type is letters and displaying a menu for controlling the letters, and
control an operation for recognizing an external device corresponding to a shape by extending the minimal unit area in the given area unit when the recognition type is the shape and displaying a menu for controlling the external device.

7. The wireless terminal of claim 1, wherein the light emitting pointer unit points at the external object in a menu execution recognition mode, and
wherein the menu execution recognition mode starts when the predetermined input of the input unit or the touch screen is sensed.

8. The wireless terminal of claim 7, wherein the controller controls to notify a user of a start of the menu execution recognition mode by generating at least one of a start sound and a vibration.

9. The wireless terminal of claim 1, wherein the controller is further configured to:
control an external device, if the recognized external object is the external device.

10. A method for executing a menu in a wireless terminal including a light emitting pointer unit and a camera, the method comprising:
simultaneously operating the light emitting pointer unit and the camera upon sensing a predetermined input of one of an input unit and a touch screen;
photographing, by the camera, an external object pointed at by the light emitted from the light emitting pointer unit, in response to determining a motion of the wireless terminal is absent during a given time;
recognizing the photographed external object pointed at by the light emitted from the light emitting pointer unit; and
displaying a menu for controlling the recognized external object.

11. The method of claim 10, wherein displaying the menu comprises:
storing a first image captured by photographing the external object pointed at by the light emitted from the light emitting pointer unit;
terminating an operation of the light emitting pointer unit, after the first image is captured;
storing a second image captured by photographing the external object previously pointed at by the light emitted from the light emitting pointer unit, after the light emitting pointer unit is terminated;
extracting pixel values of a portion of the external object hidden by the light emitted from the light emitting pointer unit displayed on the first image from the second image by comparing the first image to the second image;
extracting an image included in an area set around the light emitted from the light emitting pointer unit displayed on the first image; and
displaying a menu for controlling the extracted image.

12. The method of claim 11, wherein displaying the menu further comprises:

setting a minimal unit area around the light emitted from the light emitting pointer unit displayed on the first image;

extracting an image included in a minimal unit area and determining a recognition type through the extracted image;

extracting letters while extending the minimal unit area in a given area unit when the recognition type is the letters, and displaying a menu for controlling the extracted letters; and determining an external device corresponding to a shape while extending the minimal unit area in the given area unit when the recognition type is the shape, and displaying a menu for controlling the external device.

13. The method of claim 12, wherein the recognition type is determined by applying a priority for recognition.

14. The method of claim 10, wherein the light emitting pointer unit points at the external object in a menu execution recognition mode, and wherein the menu execution recognition mode starts when the predetermined input of the input unit or the touch screen is sensed.

15. The method of claim 14, further comprising:
notifying a user of a start of the menu execution recognition mode by generating at least one of a start sound and a vibration.

16. The method of claim 10, further comprising:
if the recognized object is an external device, controlling the external device.

17. A method for executing a menu in a wireless terminal, comprising:

simultaneously operating a light emitting pointer unit and a camera, when the wireless terminal switches to a menu execution recognition mode;

capturing, by the camera, a first image including an external object pointed at by light emitted from the light emitting pointer unit;

determining whether a plurality of points are designated by the light emitted from the light emitting pointer unit on captured image;

extracting, from the captured image, pixel values corresponding to the plurality of points, when the plurality of points are designated;

extracting an area having the extracted pixel values as boundary values from the captured image; and displaying a menu for controlling a second image included in the area.

* * * * *